May 13, 1930.  E. L. SHERLING ET AL  1,758,065
DUSTING MACHINE
Filed June 11, 1926
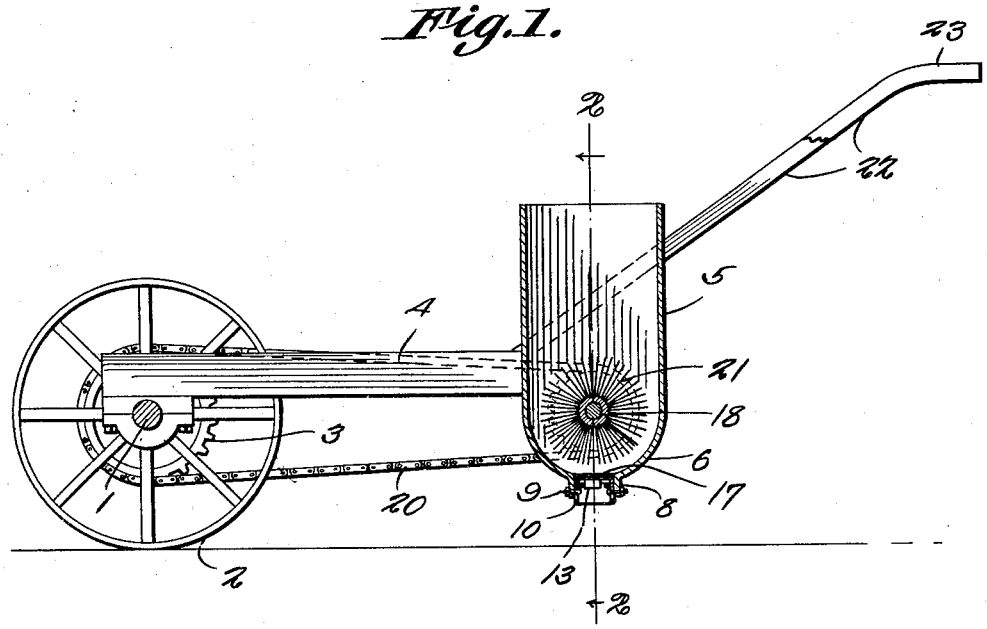
Fig.1.
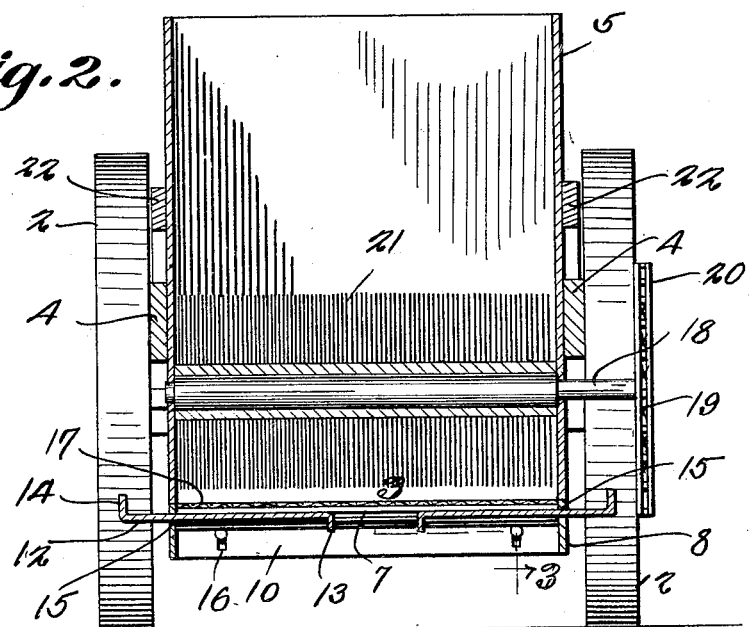
Fig.2.
Fig.3.
E. L. Sherling
G. E. Cunningham  Inventors,
By C. A. Snow & Co.
Attorneys.

Patented May 13, 1930

1,758,065

UNITED STATES PATENT OFFICE

EMMET L. SHERLING AND GEORGE E. CUNNINGHAM, OF MACON, GEORGIA

DUSTING MACHINE

Application filed June 11, 1926. Serial No. 115,297.

This invention relates to a machine designed primarily for distributing poison in powdered or dust form over growing plants for the purpose of destroying insects.

It is an object of the invention to provide a simple and compact machine of this type which can be manipulated readily and which has means for delivering the powdered material as rapidly as desired, the mounting of the machine being such that the point of delivery can be quickly placed directly over the plant or plants to be treated.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a vertical longitudinal section through the machine.

Figure 2 is an enlarged section on line 2—2, Figure 1.

Figure 3 is a section on line 3—3, Figure 2.

Referring to the figures by characters of reference 1 designates the axle of the machine supported by wheels 2 to one of which is connected a sprocket 3. Mounted on the axle are the front end portions of side beams 4 the rear portions of which are secured to opposite sides respectively of a hopper 5. The front and back walls of this hopper are rounded to provide a bottom 6 having a longitudinally extending outlet opening 7 extending from one side to the other of the hopper. Extending downwardly from the walls of this outlet opening are flanges 8 and the front and back flanges are provided with clamping bolts 9. These bolts are extended through the depending flanges 10 of supporting guides 11 arranged in pairs, the guides of each pair being superposed so as to receive between them opposed edge portions of slidable strips 12. These strips constitute valves and have their inner ends downturned as shown at 13 while their outer ends are preferably upturned as shown at 14. The slides extend through slots 15 in the side flanges 8. Slots 16 are formed in the flanges 10 for the reception of the bolts 9 so that it is thus possible to adjust the guides 11 and the supported strips 12 vertically.

Supported upon the guides 11 is a screen 17 through which all of the material to be delivered must pass.

A shaft 18 is journaled on the sides of the hopper 5 and has a socket 19 secured to one of the ends thereof adapted to receive motion through a chain 20 from the sprocket 3. Mounted on this shaft 18 is a cylindrical brush 21 adapted to work close to or to contact lightly with the top surface of the screen 17. Arms 22 are extended upwardly from the sides of the hopper 5 and terminate in handles 23. Thus it will be seen that after the powdered portion has been placed in the hopper 5 the same can be placed astride a row of plants to be treated so that the bottom of the hopper will thus be supported above the row. After the slides or strips 12 have been adjusted to provide an opening of the desired length between them the machine is moved forwardly and motion will thus be transmitted from the wheels 2 to the brush 21 with the result that the contents of the hopper will be thoroughly agitated and will be forced or beaten through the screen 7 and thence through the space between the slides and onto the plants. The weight of the hopper and its contents is carried mainly by the operator who grasps the handles 23. Thus the machine can be swung laterally to position the outlets of the hopper directly over the plant or plants to be treated. By regulating the slides the amount of dust delivered can be controlled and by adjusting the guides vertically the screen can be brought closer to or can be spaced from the periphery of the brush.

What is claimed:—

A dusting machine including a hopper having a rounded bottom provided with a longitudinally extending outlet opening from one side to the other, flanges depending from the walls of the outlet, supporting guides below the outlet having depending flanges adjustably connected to the first named flanges, the said supporting guides being arranged in pairs and the guides of each pair being superposed, strips slidably mounted at their edges between the superposed guides and adjustable therewith, said strips being extended through slots at the sides of the hopper and shiftable relative to each other to vary the size of the stream of material delivered from the hopper, a screen mounted on the guides, a shaft mounted for rotation in the hopper, and a cylindrical brush rotatable with the shaft and extending close to the screen.

In testimony that we claim the foregoing as our own, we have hereto affixed our signatures.

EMMET L. SHERLING.
GEORGE E. CUNNINGHAM.